May 19, 1959  A. E. ROSANDER  2,887,038
AUTOMATIC PRESSURIZED COFFEE-MAKER
Filed Aug. 26, 1954  2 Sheets-Sheet 1
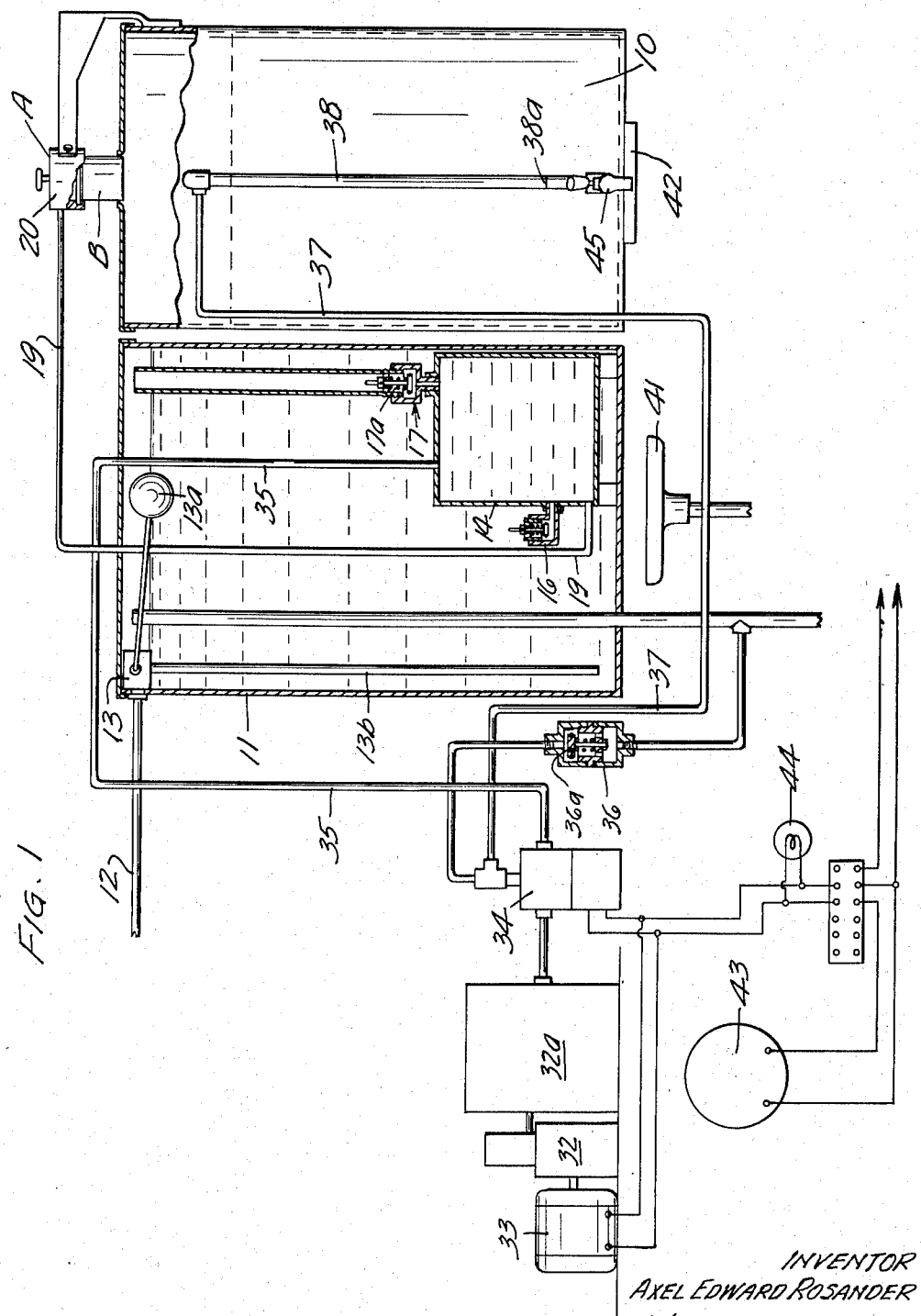
INVENTOR
AXEL EDWARD ROSANDER
Williamson, Williamson, Schroeder & Adams
ATTORNEYS May 19, 1959 A. E. ROSANDER 2,887,038
AUTOMATIC PRESSURIZED COFFEE-MAKER
Filed Aug. 26, 1954 2 Sheets-Sheet 2
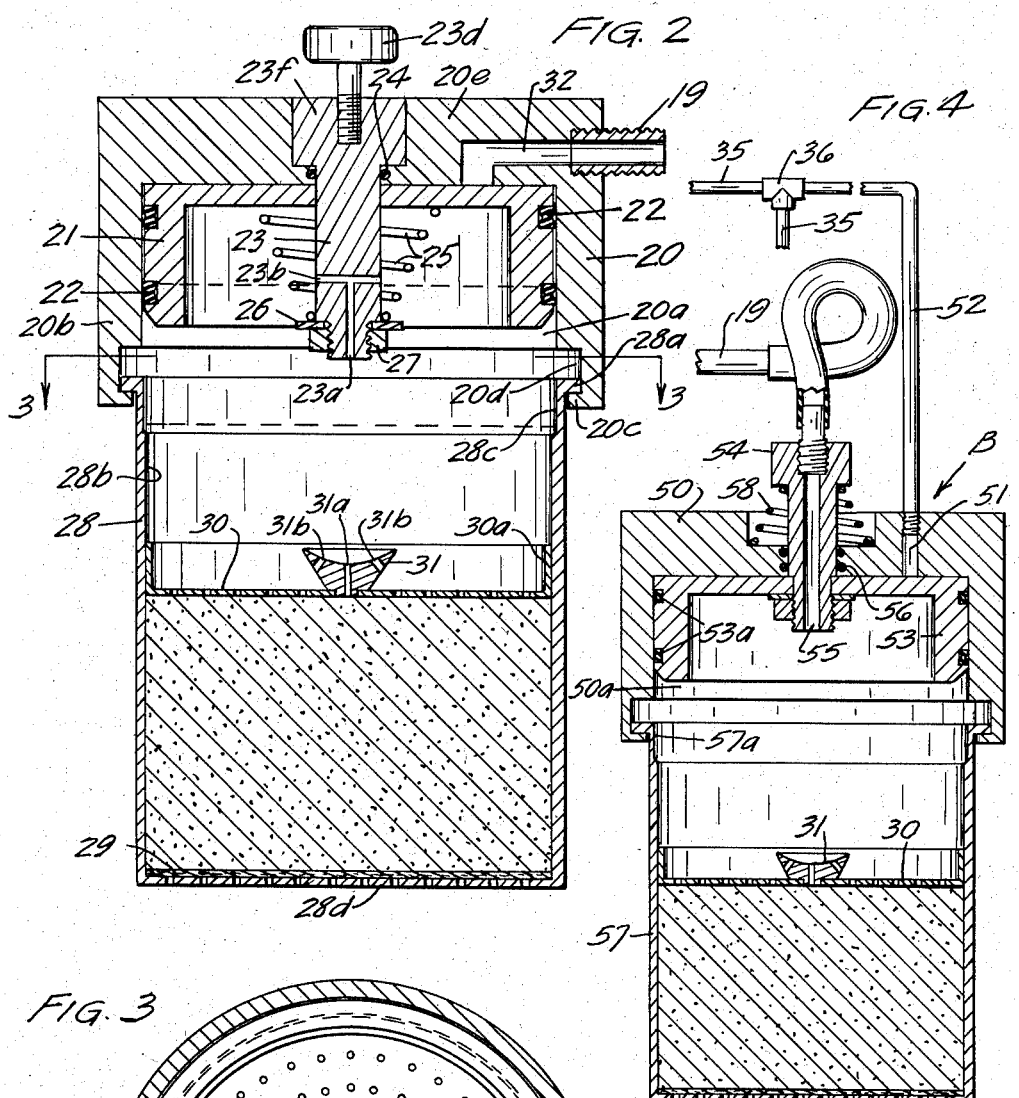
INVENTOR
AXEL EDWARD ROSANDER
BY Williamson, Williamson, Schroeder, & Adams
ATTORNEYS United States Patent Office 2,887,038
Patented May 19, 1959

2,887,038
AUTOMATIC PRESSURIZED COFFEE-MAKER

Axel Edward Rosander, Edina, Minn.

Application August 26, 1954, Serial No. 452,321

6 Claims. (Cl. 99—307)

This invention relates generally to an automatic coffee-maker of the type wherein hot water is forced under pressure through confined ground coffee.

In the past a number of different inventions have been developed wherein the hot water has been forced under pressure through the coffee in order to obtain the maximum coffee volume and flavor from a given amount of coffee. While the general idea of making coffee in this manner has proved to be satisfactory all of these prior inventions require manual actuation of the various steps in the operation thereof.

It is therefore an object of my present invention to provide an automatic coffee-maker of the pressurized feed type which will produce a maximum volume of coffee of the desired strength from a given amount of ground coffee.

It is another object to provide a combination of interrelated and cooperating elements which work together to produce a highly efficient automatic coffee-maker wherein coffee of precisely uniform controllable strength will be produced.

It is still another object to provide a timer-controlled mechanism for feeding a predetermined volume of hot water under predetermined pressure through a selected quantity of ground coffee and to maintain the liquid coffee thus produced at a predetermined temperature.

It is a further object to provide an automatic coffee maker which will feed under pressure a predetermined volume of hot water through a selected quantity of confined ground coffee and will subsequently automatically isolate and reheat another similar volume of hot water for the next batch responsive solely to the completion of the preparation of the previous batch.

More specifically it is an object to provide in combination with a timed system for forcing a predetermined volume of hot water through confined ground coffee, a coffee infusor having an upper head member defining an upper cylindrical chamber therewithin and adapted to removably receive a lower head member or coffee confining basket having a lower cylindrical chamber in the upper portion thereof in alignment with the upper cylindrical chamber depending therefrom, said upper head being provided with a pressure-responsive projectable sealing member constructed for projection into the upper portion of said lower cylindrical chamber and simultaneously controlling the flow of hot water into said basket while maintaining a peripheral seal across the upper portion thereof and across the lower portion of the upper chamber.

It is another specific object to provide an automatic coffee-maker of the pressurized hot water supply type having a coffee infusion head assembly with an upper head member defining an upper sealed chamber and a coffee confining lower head member easily and quickly removable from said upper head member without sealed connection therebetween, said upper chamber having a downwardly projectable piston member working therein to the pressure of the supply of hot water under pressure for projection a predetermined distance downwardly into the upper portion of the lower head member when the same is in operative position with means for peripherally sealing the lower portion of the upper chamber and the upper portion of the lower chamber and affording communication therebetween only through a passage provided in a medial portion of said piston whereby pressure is maintained in both the upper and lower chambers and whereby removal of the coffee-confining basket is prevented as long as fluid pressure is applied to the upper chamber, said piston also preventing flow of liquid from the upper chamber to the lower chamber until said piston has been projected downwardly into sealing position.

These and other objects and advantages of my invention will more fully appear from the following description made in connection with the accompanying drawings wherein like reference characters refer to the same parts throughout the several views and in which:

Fig. 1 is a diagrammatic view of my coffee-making assembly with certain parts being shown in vertical section and certain parts being shown in side elevation;

Fig. 2 is a central vertical sectional view of one form of my infusion head assembly and showing the projectable sealing and valve piston in raised position by full lines and in downwardly projected operative position by dotted lines;

Fig. 3 is a horizontal sectional view taken substantially along the line 3—3 of Fig. 2; and Fig. 4 is a vertical sectional view of an alternative form of an infusion head assembly, showing the projectable piston in raised position in full lines and in downwardly projected operative position by dotted lines.

As illustrated in the accompanying drawings I provide a coffee-maker having a coffee storage tank 10 for the prepared coffee and a water heater tank 11 insulated therefrom. A water supply line 12 delivers water to the heater tank 11 and the flow of water into said tank is controlled by a float valve 13 of conventional design and having a float 13a and a submerged discharge pipe 13b.

Confined within the heater tank 11 is a premeasuring tank 14 disposed in the form shown, near the bottom of said tank 11. An inlet conduit 15 having a back-flow preventing check valve 16 permits water to flow from heater tank 11 into premeasuring tank 14 whenever the pressure in the heater tank exceeds the pressure in the premeasuring tank 14. The check valve 16 has a light tension spring 16a normally holding the same in open position to permit flow of water from the heater tank 11 into the premeasuring tank. However, said spring is yieldable to a predetermined back pressure applied from the premeasuring tank to close said check valve 16 and prevent back flow of fluid from the premeasuring tank back into the heater tank. A similar check valve 17 controls the flow of fluid through a vent tube 18 mounted in upwardly extending relation from the top of premeasuring tank 14 and normally permits flow of air from premeasuring tank 14 as the same is filled through conduit 15 from heater tank 11. However, when a predetermined fluid pressure is produced in premeasuring tank 14 the yieldable spring 17a of check valve 17 permits the valve to close so that said pressure can be maintained within the tank 14 for purposes to be brought out hereinafter. A hot water supply line 19 extends from the bottom of premeasuring tank 14 to a coffee infusion head assembly and disposed above the coffee storage tank 10, as best shown in Fig. 1.

Referring now to Fig. 2, one form of said head assembly A has an upper head member 20 which is securely fixed above said tank 10 by any suitable means such as bracket 10a and defines a cylindrical upper chamber 20a within which a close-fitting sealing and valve piston 21 is mounted for up and down shifting movement. A pair of vertically spaced apart peripheral seals are provided by the two quad-rings 22 and form a positive seal between said piston and the portion of the cylindrical chamber 20a engaged thereby. A piston mounting and guiding post 23 is sealingly mounted through the closed top or cap 20e of head member 20. The upper portion of the post 23 is enlarged as indicated at 23f to form a positive positioning stop shoulder adapted to be tightly received within a suitable recess provided in cap 20e. A suitable seal surrounds post 23 such as the O-ring 24 and prevents flow of fluid upwardly through the cap around said post. A close working fit is provided between the post 23 and a central opening formed through the dome of the piston 21 to permit said piston to be shifted upwardly and downwardly in a predetermined guided straight-line path. A yieldable return spring 25 is interposed between a mounting washer 26 and the bottom side of the top of piston 21, as best shown in Fig. 2 to yieldably urge said piston upwardly into retracted position. The washer 26 is retained on the bottom of post 23 by any suitable means such as a retaining nut 27.

The bottom peripheral portion of said upper head member 20 has a depending skirt portion with basket retaining flange 20b formed thereon and a groove 20c is formed around the inside of said skirt above said flange and extends upwardly a substantial distance above the flange 20b thereabove. The skirt constitutes a cylindrical segment which extends around slightly more than half the circumference of the head member 20 as best shown in Fig. 3. I provide a lower head member or coffee confining basket 28 which has an outwardly extending annular mounting flange 28a formed around the upper periphery thereof. The flange 28a is of a diameter to be received within groove 20d and to overlie the retaining flange 20c of the skirt element and the ends of groove 20c are sufficiently deep to maintain the full width of the diameter of basket 28. The flange 20c securely supports said basket 28 in depending relation therefrom and the upper portion of the basket 28 defines a lower cylindrical chamber 28b which is axially aligned with the upper chamber 20a when the basket is disposed in operative position. In the form shown, the upper portion 28c of the basket member 28 is machined to the same diameter as the upper chamber 20a so that the side walls of the inside surface of the machined portion may be aligned with the side walls of the chamber 20a. For purposes to be subsequently brought out, the groove 20d is materially deeper than the thickness of basket flange 28a so that the basket may be shifted upwardly a slight distance with respect to the fixed mounting head 20. The bottom 28d, of the basket 28 is perforated to permit the coffee to be discharged downwardly through a filter paper 29 which may be provided across the top surface of said basket bottom to positively prevent any of the ground coffee from passing through said perforation. A water diffusing and distributing plate 30 is removably mounted in said basket or lower head member and has an upwardly extending stabilizing skirt 30a, the outside diameter of which is substantially the same as the inside diameter of the basket. A central diffusing cup 31 is fixed to the top of said plate 30 and in the form shown, a central aperture 31a extends therethrough with a plurality of peripherally spaced apertures 31b provided through outwardly disposed portions thereof. Said diffusing plate 30 distributes the hot water uniformly over the entire upper surface of the ground coffee disposed therebelow. The conduit 19 from premeasuring tank 14 communicates with the upper chamber 20a through a passage 32 formed in the upper cap 20a of said mounting head 20. The lower portion of guide post 23 has an axially disposed discharge passage 23a extending upwardly from the lower extremity thereof. A plurality of radially disposed delivery passages 23b extend radially outwardly from the upper portion of axial passage 23a for purposes to be brought out hereinafter.

An air compressor 32 driven by a motor 33 is provided and supplies air under pressure to a pressure tank 32a and thence to premeasuring tank 14 through a valve 34 and conduit 35. The valve 34 is in the form shown a solenoid valve which is normally closed and when in closed position closes the port from the compressor supply line and permits communication between premeasuring tank 14 through conduit 35 and the lower portion of coffee tank 10 through conduit 37 and a coffee level sightgage 38. A T coupling member 39 connected to conduit 37 and solenoid valve 34 is also connected to a drain conduit 40 which has a check valve 36 mounted therein and said check valve 36 has a restricted bleed aperture 36a through the closure element thereof for purposes to be brought out hereafter.

A timer switch 43 of the type adapted to be manually set is connected in series with the solenoid valve 34 and energizes the solenoid winding when initially set by the operator, and maintains said solenoid in energized position for the timed interval set thereon.

Any conventional means for heating the water supply tank 11 and the coffee tank 10 may be provided, such as the conventional thermostatic controlled gas burner 41 provided under water heater tank 11 and a thermostatically controlled electric heating element 42 provided under the coffee tank 10. The two tanks are insulated so that the temperature of the liquid therein may be accurately and individually controlled.

The following is a description of the operation of my automatic pressurized coffee-maker. The timer switch 43 is initially closed by the operator and energizes the solenoid 34 for the predetermined time interval set thereon. A pilot light 44 may be provided to indicate that the apparatus is preparing a new batch of coffee, which of course begins as soon as the solenoid valve 34 is energized. Energization of said solenoid valve opens the air compressor supply line and introduces air under pressure into premeasuring tank 14, closing off the port to the drain and exhaust conduit. This pressure within tank 14 immediately closes check valves 16 and 17 and forces the predetermined volume of water contained in said tank progressively outwardly through the hot water supply line to the guiding and mounting head 20. The water under pressure supplied through line 19 initially projects the piston 21 downwardly so that the lower portion thereof is projected into the upper portion 28a of the coffee confining basket 28 which has been previously filled with the desired amount of coffee and attached below the head 20 by interengaging flanges 20c and 28c. The lower quad-ring 22 sealingly engages the upper machined portion 28c of basket 28 to form a peripheral seal therearound and the upwardly spaced quad-ring 22 sealingly engages the side wall of the lower portion of chamber 20a to provide a peripheral seal therearound. The center post 23 provides the necessary guide for said sealing piston and when said piston has been projected downwardly by the pressure exerted thereon in the hot water from tank 14, until spring 25 has been fully compressed; the top of the piston will pass below the radial passages 23b and permit the flow of water under pressure from passage 32 and the upper portion of chamber 20a to flow downwardly through the central discharge aperture 23a and be directed onto the cup shaped diffusing member 31 so that the initial discharge of hot water will not wash straight through the ground coffee and produce a washed out passage therethrough. The resistance of water flow through the coffee grounds, is of course, sufficient to maintain a substantial pressure within the upper portion of basket 28 and within the coffee confining portion of said lower member 28 so that the coffee grounds are subjected to a predetermined pressure exerted by the water introduced at close to boiling temperature. This hot water under pressure is distributed uniformly over the top of the ground coffee and ultimately passes through the coffee and is discharged through the filter paper 29 and perforated bottom 28d of the basket 28. When the entire premeasured volume of water contained within premeasuring tank 14 has been discharged through said confined coffee and the time interval set on the time clock 43 has expired, the solenoid valve being de-energized closes the pressurized air supply line from air compressor tank 32a, and the residual pressure contained in premeasuring tank 14 will then flow back through line 35, suitable passages in solenoid valve 34 and will close check valve 36 so that said air will be forced to travel through conduit 37 and down through sight gage 38 into the bottom of coffee tank 10 and will bubble up through the liquid coffee contained therein to thoroughly intermix the same so as to produce coffee of uniform strength throughout the entire tank 10. An indicator mark 38a may be provided on the sight gage 38 to indicate the maximum liquid coffee level within tank 10 which will permit a full batch of new coffee to be added thereto without overflowing said tank.

Obviously when the piston 21 has been projected downwardly into the upper portion of the basket 28 said piston will positively lock said basket in operative position and prevent removal thereof. When the pressure is released from premeasuring tank 14, and complete release of this pressure is insured by the provision of the bleed opening 36a in check valve 36, the spring 25 has sufficient tension to return piston 21 back into the upper chamber 20a to permit removal refilling of the coffee basket 28. In the event that said spring should become weakened and broken and would not return said piston to its fully retracted position thus preventing removal of the basket 28, the guide post 23 may be manually lifted by a gripping knob 23d provided on the top thereof and said post, will of course, carry the piston upwardly with it to retract the same from the upper portion of the basket 28 and thus permit removal of said basket and access to spring 25 for replacement or repair thereof. Unless the coffee basket 28 is precisely aligned with the upper chamber 20a the piston will not be permitted to be projected downwardly into the upper machined portion 28a of the basket and will prevent water from passing through the radial passages 23b and the vertical discharge passage 23a of post member 23 since the top of the piston will be held above the inlet of the radial ports 23b by engagement with the top of basket 28. A coffee faucet 45 is provided at the bottom of sight-gage 38 to permit liquid coffee to be drawn off from tank 10 for serving.

As illustrated in Fig. 4, an alternative form of my invention is shown. In this form of the invention, an infusion head assembly B is provided. An upper head member 50 defines an upper chamber 50a therewithin and has an air inlet passage communicating with the top thereof and is connected to air supply conduit 35 by a T member 36 and a branch conduit 52. A piston 53 is fixed to the lower portion of the reciprocable mounting and guiding post 54, having a water supply passage 55 extending longitudinally the full length thereof for supplying water under pressure from premeasuring tank 14 to the lower chamber of the infusion head assembly B disposed below piston 53. Suitable means for sealing the wall between post member 54 and head member 50 are provided, such as the O-rings 56. A lower head member or basket 57 is provided for connection with the lower portion of upper head member 50 in a manner similar to the connection between upper head member 20 and basket 28 of infusion head assembly A.

The following is a description of the operation of assembly B. When the valve 34 is energized, air will be supplied under pressure to line 35 and directly therefrom to conduit 52 and upper chamber 50a. This will immediately cause piston 53 to be shifted downwardly within the chamber defined in the upper head 50 and will project said piston into upper portion 57a of basket member 57 to peripherally seal the upper portion of said basket by suitable sealing means such as the lower quad-ring 53a mounted around said piston. The pressure produced in premeasuring tank 14 by the air from line 35 will cause the water in the premeasuring tank to flow out through conduit 19 which has a flexible connection with the upper end of hollow post member 54 and supplies water under pressure to the sealed infusion chamber in which the coffee is confined, the upper portion of which is sealed by lower quad-ring 53a. An upper quad-ring 53a spaced above lower quad-ring 53a, of course, seals the lower portion of the upper chamber 50a and maintains the air pressure therein to hold the piston 53 in downwardly projected chamber closing and sealing position. A retraction spring 58 yieldably urges said piston 53 upwardly into retracted position and causes said piston 53 to return upwardly into normal retracted position when the pressure in line 52 is released.

It is important to note that the check valves 16 and 17 will remain closed to prevent water from flowing into the premeasuring tank as long as the pressure in the premeasuring tank exceeds the liquid pressure exerted on valve 16, the valve 17 opening of course, as soon as the pressure in the premeasuring tank falls sufficiently to permit the spring 17a of check valve 17 to overcome the same. The supply of hot water from the premeasuring tank 14 to the coffee infusion head assembly A or B is responsive to the manual setting of timer switch 43 to shift the two position three-way solenoid valve 34 into its energized operative position and pressure from said compressor tank 32a will be supplied to said premeasuring tank until the timer switch 43 opens the circuit to the solenoid valve 34, to permit said valve to return to normally closed position to shut off the pressure supplied to the premeasuring tank and release said pressure back through conduit 35, valve 34 and conduit 37 or bleed opening 36a. As soon as the pressure has dropped in premeasuring tank 14 so that the liquid pressure within tank 11 exceeds the pressure within said tank 14 hot water will flow through check valve 16 and fill premeasuring tank 14, the air at atmospheric pressure left in said tank being exhausted through check valve 17 and vent pipe 18.

Thus it will be seen that I have provided a relatively simple yet highly efficient coffee making mechanism which is fully automatic after being manually initiated by an operator setting timer switch 43. Obviously, the setting of timer switch 43 could be responsive to an actuating mechanism controlled by the level of the coffee in tank 10, however, it is not thought that such mechanism need be illustrated in the drawing. The coffee infusion head assemblies A and B with the pressure responsive projectable sealing pistons 21 and 53 are particularly adapted for use with such an automatic mechanism, the operator being required only to replace the coffee charge in the basket 28 for each new batch of coffee to be made.

It should be noted that each batch of coffee is thoroughly intermixed by the exhaust air from the premeasuring tank 14 being bubbled up therethrough and sufficient release of the pressure within premeasuring tank 14 is insured through bleed opening 36a to permit valve 17 to open.

The baskets 28 and 57, in forms A and B of my infusion head assembly are constructed to be laterally shifted into the front opening of skirt portion 20b and of head member 20 and a similar skirt portion provided at the lower extremity of head member 50. In the forms shown the basket flange 28a and a similar flange provided at the top of basket 57 is engaged at the top portion of groove 28d and similar groove provided in head member 50 in order to permit the bottom of the basket to clear the top of liquid coffee receiving and confining tank 10. As best shown in Fig. 1, the top of said tank 10 has an opening formed in the center thereof with a slightly raised portion surrounding said opening thus requiring the basket to be raised above this raised portion and subsequently dropped down therewithin. This of course, is the reason for providing a groove in the upper head member which is substantially deeper than the upper flange or the basket. This permits extremely quick and easy lateral insertion of the basket into the bottom of the upper head member and also insures proper alignment and positioning of said basket below said head member since the basket will not drop into the opening into the tank top unless the same is properly aligned therewith.

Projection of the sealing piston downwardly into the upper portion of the basket positively prevents removal of the basket during the preparation of a batch of coffee and after said preparation has been completed the retraction spring for form A of my invention and 53 in form B of my invention will return the piston back into retracted position and permit removal of the basket.

It will of course be understood that various changes will be made in the form, detail, arrangement and proportion of the parts without departing from the scope of my invention, which generally stated, consists in the matter disclosed in claims herein.

What I claim is:

1. An automatic coffee maker of the pressurized infusion type having in combination, a coffee infusion head assembly, means for supplying a predetermined volume of hot water under pressure to said assembly, said head assembly comprising a mounting head member defining a chamber therewithin, a ground coffee confining head member readily removable from said mounting head member and defining a coffee confining chamber in the portion thereof remote from said mounting head member, adjacent portions of said head members combining to form a continous chamber of uniform size and shape, a pressure responsive member mounted in said continous chamber and having sealing means associated therewith for shifting movement thereby to sealingly engage closely spaced substantially adjacent portions of said head members in said continous chamber to form a pair of positive seals on opposite sides of the connection between said head members and to sealingly isolate said coffee confining chamber from the portion of said continous chamber disposed within said mounting head, means defining a liquid flow passage into said coffee confining chamber and connected with the hot water supply means, and controllable fluid pressure means associated with said pressure responsive member to actuate the same and shift said peripheral sealing elements into sealed position.

2. An automatic coffee maker of the pressurized infusion type having in combination a coffee infusion head assembly, means for supplying a predetermined volume of hot water under pressure to said assembly, said head assembly comprising an upper mounting head member defining an open bottom upper chamber in the lower portion thereof, a ground coffee confining lower head member removably attached to said upper head member and defining a coffee confining chamber therewithin with a hot water inlet communicating with said coffee confining chamber, said lower head member having an open top and providing a discharge opening in the bottom thereof through which liquid coffee may be discharged while confining the ground coffee within said coffee confining chamber, a pressure responsive shiftable member working in said upper chamber, the upper portion of the lower chamber being of the same size and shape as the upper chamber to form a continuation thereof, a fluid pressure means associated with said pressure responsive member to shift the same downwardly into the upper portion of the lower head member, sealing means carried by said pressure responsive member for sealingly engaging the lower portion of the upper chamber and the upper portion of the continuation thereof formed by said lower head member to provide a coffee confining chamber sealed except for said liquid coffee discharge opening and said hot water inlet, and whereby a substantially constant liquid pressure may be maintained within said coffee confining chamber during infusion of the coffee therein, and a coffee receiving container receiving from the discharge opening of said coffee confining chamber.

3. The structure set forth in claim 2 and said pressure responsive member comprising a piston having a pair of vertically spaced peripheral sealing elements mounted therearound with a center piston guiding and mounting post carried by said upper head member, said piston being responsive to said fluid pressure means for shifting downwardly into said lower head member to peripherally seal the upper portion thereof and said center post member having a liquid flow passage therein communicating with said hot water supply and carrying hot water therefrom to said coffee confining chamber.

4. The structure set forth in claim 3 and said upper head member having a liquid inlet means formed therein above said piston and communicating with said hot water supply means and said piston being slidably mounted on said member for downward projection in response to the flow of hot water through said inlet means said liquid flow passage having its inlet disposed in spaced relation below the normal retracted position of the top of said piston so that flow of liquid under pressure into said coffee confining chamber is permitted only after downward projection of said piston into sealing position has been initially produced by said hot water supplied under pressure through said upper chamber.

5. The structure set forth in claim 3 and said upper head member having a fluid pressure inlet therein above said piston with said post member being slidably mounted in said head member and having the fluid flow passage extending the full length thereof to discharge directly into said coffee confining chamber from said hot water supply means.

6. An infusion head assembly for automatic coffeemaker comprising an upper head member having a depending peripheral skirt portion with an arcuate segment thereof cut away, a coffee confining basket member defining an infusion chamber therewithin and having its upper end laterally insertable into said skirt to axially align said skirt and said basket, connecting means between the basket and the skirt for providing vertical support of the basket on the skirt, a downwardly projectable sealing member normally mounted within the upper head and having peripheral sealing means around the lower portion thereof, means for projecting said sealing member downwardly into the upper end of said basket when the same is mounted in said skirt, said projectable member being of sufficient length to peripherally engage with the upper portion of the basket and the lower portion of the skirt when in downwardly projected position to not only lock said basket in infusion position but also provide a pressure seal around the top of the basket, and means supplying liquid to the infusion basket through said projectable member.

References Cited in the file of this patent

UNITED STATES PATENTS

| | | |
|---|---|---|
| Re. 22,879 | Peters et al. | May 13, 1947 |
| 1,390,008 | Arduino | Sept. 6, 1921 |
| 1,467,778 | Paola | Sept. 11, 1923 |
| 1,662,547 | Urtis | Mar. 13, 1928 |
| 1,750,068 | Torriani | Mar. 11, 1930 |
| 1,774,980 | Lambert | Sept. 2, 1930 |
| 1,822,433 | Brand | Sept. 8, 1931 |
| 2,048,350 | McLean | July 21, 1936 |
| 2,094,981 | Fromwiller | Oct. 5, 1937 |
| 2,205,290 | Herrera | June 18, 1940 |
| 2,264,837 | Gavin et al. | Dec. 2, 1941 |
| 2,283,967 | Brown | May 26, 1942 |
| 2,371,328 | Herrera | Mar. 13, 1945 |
| 2,464,862 | Herrera | Mar. 22, 1949 |
| 2,484,054 | Sharp | Oct. 11, 1949 |
| 2,598,377 | Herrera | May 27, 1952 |
| 2,618,218 | Peters | Nov. 18, 1952 |

FOREIGN PATENTS

| | | |
|---|---|---|
| 689,600 | France | May 27, 1930 |